United States Patent [19]

Fälchle et al.

[11] 4,084,829

[45] Apr. 18, 1978

[54] FORCE-TRANSMITTING ARRANGEMENT FOR HAMMER DRILLS

[75] Inventors: Jörg Fälchle, Bempfilinge; Reinhard Hahner, Kemnat, both of Germany

[73] Assignee: Robert Bosch GmbH, Stuttgart, Germany

[21] Appl. No.: 725,191

[22] Filed: Sep. 21, 1976

[30] Foreign Application Priority Data

Oct. 2, 1975 Germany ........................ 7531174[U]

[51] Int. Cl.[2] .......................... B23B 31/04; F16B 7/00

[52] U.S. Cl. .......................................... 279/99; 85/46; 173/104; 279/7; 285/334; 403/343

[58] Field of Search ................. 279/99, 7; 85/1 T, 46; 403/343, 307, 118; 285/334, 333; 173/48, 104

[56] References Cited

U.S. PATENT DOCUMENTS

Re. 27,284 2/1972 Hjalsten et al. ................. 285/334 X 3,645,570 2/1972 Johansson et al. .................. 403/307

3,707,107 12/1972 Bieri ...................................... 85/1 T

*Primary Examiner*—Z. R. Bilinsky

*Attorney, Agent, or Firm*—Michael J. Striker

[57] ABSTRACT

A force-transmitting arrangement for use in hammer drills and the like includes an internal thread in a chuck of a power tool and an external thread on a portion of the tool element which is to be mounted in the chuck, both threads being of compatible, basically trapezoidal, configurations. The flat flanks of the trapezoidal internal and external threads are offset in the radially outward direction with respect to the mean effective thread diameter. The external thread is rounded at its root with a radius substantially corresponding to the thread height of the external thread, and the internal thread is similarly rounded at its crest with a radius substantially corresponding to the thread height of the external thread, and/or chamfered.

9 Claims, 2 Drawing Figures

FORCE-TRANSMITTING ARRANGEMENT FOR HAMMER DRILLS

BACKGROUND OF THE INVENTION

The present invention relates to force-transmitting, motion-transmitting or torque-transmitting arrangements in general, and more particularly to a force-transmitting arrangement for use in a hammer drill for transmitting forces from a chuck of the hammer drill to a tool element mounted therein.

There are already known various types of motion-transmitting or force-transmitting arrangements for use in various power tools for mounting selected tool elements therein. Among the known arrangements, there is also already known to provide an internal thread in a chuck or a similar connecting element of the power tool, and to form an engaging portion of the tool element which is to be engaged by or in the chuck, with an external thread which is complementary or compatible with the internal thread of the chuck.

So long as the connection between the chuck and the tool element is only subjected to forces which act only in the axial, only in the radial or in both the axial and the radial directions of the tool elements and which are non-cyclical in nature, the configuration of the threads is only of a minimum consequence, so that it is already known to use various threads, such as a standard thread, knuckle thread, rectangular thread or trapezoidal or acme thread, for connecting the engaging portion of the tool element to the chuck, when threaded connection of these components is selected.

It has also already been attempted to use a threaded connection as the force-transmitting arrangement between a chuck of a hammer drill and a tool element mounted therein. In this conventional connection, the threads of the chuck and of the tool element are configurated symmetrically, that is, the portions of the respective thread which are located radially outwardly of the mean effective thread diameter of the respective thread are of configurations which are the same as the space between those portions of the same thread which are located radially inwardly of the mean effective thread diameter, and vice versa. For this to be true, the flanks, the crests and the roots of the threads must be of mutually complementary configurations, on the one hand, but the flanks of the threads must also be equivalently configurated to the two sides of the mean effective thread diameter on the other hand.

Experience with this type of a connecting arrangement, or a force-transmitting arrangement, in use in a hammer drill, has shown that the external thread at the engaging end of the tool element is more susceptible to damage, particularly to shear, than the internal thread of the chuck of the power tool. This is true even in the event that the materials of the female portion of the chuck having the internal thread and of the male portion of the tool element having the external thread, are the same, and particularly when the material of the male portion of the tool element is more brittle or susceptible to fatigue or notch failure than that of the female portion.

SUMMARY OF THE INVENTION

Accordingly, it is a general object of the present invention to avoid the disadvantages of the prior-art connecting arrangements.

More particularly, it is an object of the present invention to devise a motion-transmitting or force-transmitting arrangement for use in the mounting of tool elements in chucks of power tools, particularly hammer drills.

It is yet an other object of the present invention to provide an arrangement of the above-mentioned type which has high wear-resistance and a very long life span.

A concomitant object is to provide a connecting arrangement of the above-type which is simple is construction and reliable in operation.

A still further object of the present invention is to provide a threaded connection, particularly for use in hammer drills, in which the life span of the external thread of the tool element is comparable to that of of the internal thread provided in the chuck of the hammer drill.

In pursuance of these objects and others which will become apparent hereafter, one feature of the present invention resides, briefly stated, in an arrangement for transmitting forces between a chuck and a tool element mounted therein which comprises a female portion in the chuck which has an internal thread of predetermined mean effective thread diameter, and a male portion on the tool element which has an external thread of the same mean effective thread diameter, the threads having substantially trapezoidal profiles which are compatible with one another, and respective flat thread flanks which engage each other when the tool element is mounted in the chuck, the flat thread flanks of at least the external thread being offset in the radially outward direction with respect to the mean effective thread diameter. Preferably, also the flat thread flanks of the internal thread are offset in the radially outward direction with respect to the above-mentioned mean effective thread diameter.

This configuration of the threads, particularly of the external thread of the engaging portion of the tool element, brings about basically two advantages. On the one hand, it eliminates or substantially reduces the notch effect which is present in a standard trapezoidal profile or acme thread, so that the danger of breaking or shearing of the external thread of the engaging portion of the tool element is substantially reduced. On the other hand, when compared with a standard knuckle or rounded thread, the load-carrying flank is a helical surface rather than a helical line, so that the wear of the thread is reduced owing to the surface contact rather than the line contact of the knuckle thread. According to a currently preferred embodiment of the present invention, the thread both on the male and female portion, is shaped as a multi-start thread, particularly as a double-start thread. This further improves the transmission of the forces which act on the threads during the operation of the power tool, such as a hammer drill, and further minimizes the danger of damage to either the external or to the internal thread.

According to a yet further advantageous concept of the present invention, the external thread of the male portion of the tool element is rounded at the root of the thread with a radius which substantially corresponds to the thread height, which is one half of the difference between the major and the minor diameter of the external thread. Similarly, the internal thread is rounded at the crest of the thread with a radius substantially corresponding to the thread height of the internal thread, which corresponds to one half of the difference between the major diameter and the minor diameter of the internal thread. The rounding, particularly of the root of the external thread, further contributes to the elimination of the danger of failure of the external thread at the root thereof.

In addition to, or instead of, the rounding of the crest of the internal thread, such crest may be chamfered, preferably at an angle of substantially 15° with respect to the internal or crest surface of the basically trapezoidal internal thread. According to a further aspect of the present invention, the flat thread flanks of each of the threads enclose with one another a thread profile angle which amounts to substantially 60°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DISCUSSION OF THE PREFERRED EMBODIMENTS

Figure 1:
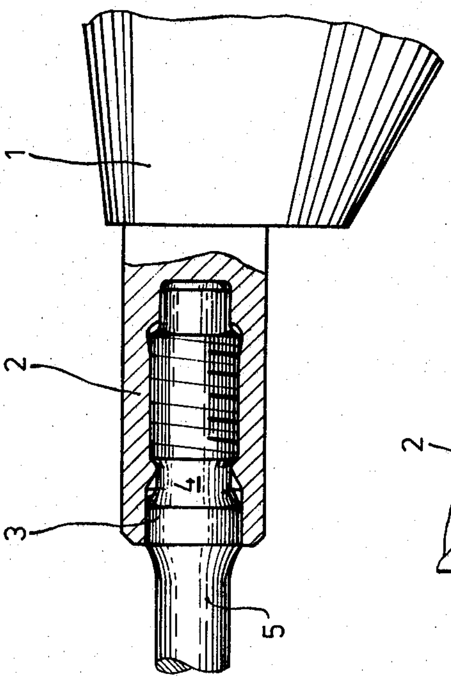
FIG. 1 is a fractional, partially sectioned, view of a chuck of a power tool and of a tool element mounted therein.

Referring now to the drawing, and first to FIG. 1 thereof, it may be seen that a housing of a power tool 1, which has been only partly shown, has mounted at its one, illustrated, end a tool-mounting or tool-receiving arrangement or chuck 2. The chuck 2 has a central bore in which there is mounted an engaging portion 4 of a drill 5 or a similar tool. The chuck 2 and the engaging portion 4 are each provided with an arrangement for transmitting forces from one to the other, which is constituted by compatible, basically trapezoidal threads, that is an external thread 6 on the engaging portion 4 and an internal thread 7 in the bore of the chuck 2. During operation of the power tool 1, such as a hammer drill, the engaging portion 4 is threaded into the bore of the chuck 2 to the greatest possible extent. The tool-accepting arrangement or chuck 2 forms a driving member for driving the tool element or drill 5 both in rotation and in the hammering operation.

Figure 2:
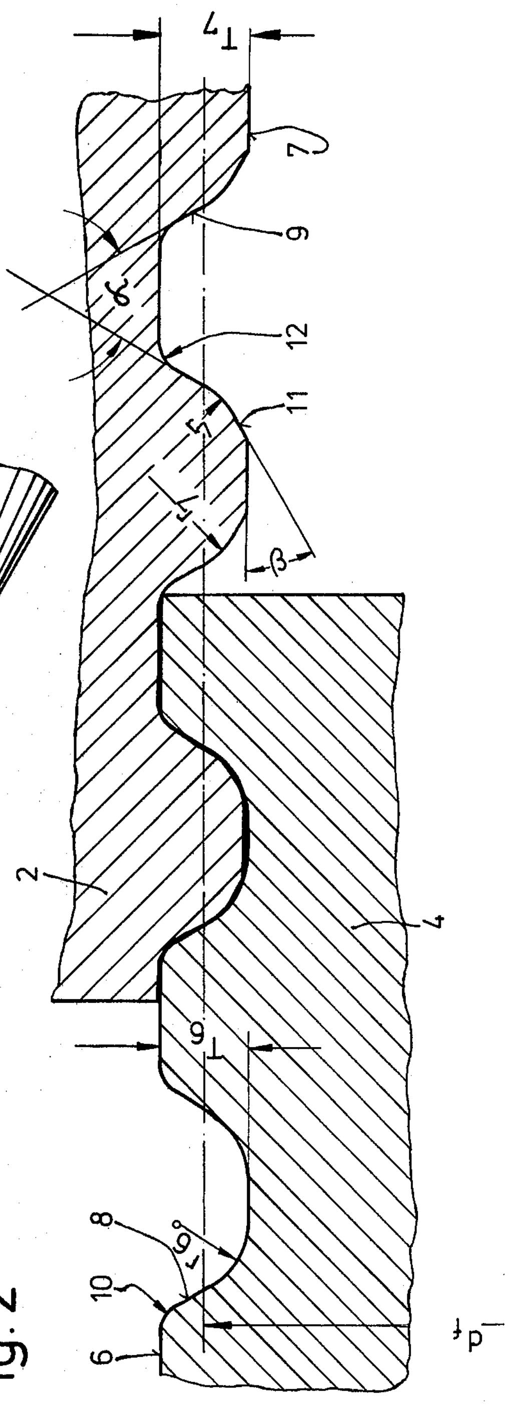
FIG. 2 shows a detail of FIG. 1 at an enlarged scale.

As seen in FIG. 2, the flat flank 8 of the external thread 6, and also the associated flat flank 9 of the internal thread 7, which flat flanks 8 and 9 engage one another, are radially outwardly offset with respect to a mean effective thread diameter $d_F$. This is quite different from a standardized configuration of a trapezoidal thread in which the flat flanks are arranged symmetrically with respect to the mean effective thread diameter $d_F$, or in other words, where the respective flat flank extends to the same extent and in the same direction to one side of the mean effective thread diameter $d_F$ as to the other side thereof.

In addition thereto, the external thread 6 is rounded at its root with a radius $r_6$ which substantially corresponds to a thread height $T_6$ which, in turn, amounts to one-half the difference between the major or crest diameter and the minor or root diameter of the thread 6. On the other hand, the edges of the thread 6, where the flat flanks meet with the cylindrical outer surface of the thread 6 or, in other words, with the crest surfaces of the thread 6, are rounded with a small transition radius 10.

The internal thread 7 of the chuck 2 is rounded at its crest with a radius $r_7$ which at least approximately corresponds to the thread height $T_7$, which, in turn, corresponds to one-half the difference between the major or root diameter and the minor or crest diameter of the internal thread 7. In addition thereto, the crest region of the thread 7 may be provided with a chamfer, as indicated at 11. At the thread root, the internal thread 7 is rounded with a transition radius 12 which corresponds to the transition radius 10 of the external thread 6.

The flank profile angle $\alpha$ of the trapezoidal threads 6 and 7 amounts to approximately 60°, and the angle $\beta$ of the chamfer 11 amounts to substantially 15°. The illustrated trapezoidal threads 6 and 7 are shaped as multistart threads, and have been illustrated as doublestart threads. However, it is to be understood that, under certain circumstances, a single thread arrangement 6 and 7 may be used.

The trapezoidal threads 6 and 7 which are configurated according to the present invention with flat flank surfaces 8 and 9 which are radially offset in the outward direction with respect to the mean effective thread diameter $d_F$ is advantageous in that respect that the danger of material failure of the threaded portion 4 of the drill 5, or of the thread 6 thereon, as well as the wear phenomena which appear during normal use of the arrangement, are reduced to a considerable degree.

It will be understood that each of the elements described above, or two or more together, may also find a useful application in other types of constructions differing from the types described above.

While the invention has been illustrated and described as embodied in a force-transmitting arrangement for use in hammer drills, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for transmitting forces between a chuck and a tool element, comprising a threaded connection including an internal thread in the chuck and an external thread on the tool element which have a predetermined mean effective thread diameter and compatible substantially trapezoidal profiles with crests at crest diameters, roots at root diameters, heights each amounting to one-half the difference between the respective crest and root diameters, and respective flanks extending between said crests and said roots of said threads, the respective flank of each of said threads having a respective flat flank surface portion engaging the flat flank surface portion of the associated flank of the other thread when the tool element is mounted in the chuck, said flat flank surface portions of said threads being offset in the radially outward direction with respect to said mean effective thread diameter.

2. An arrangement as defined in claim 1, wherein said external thread is rounded at said root thereof with a radius substantially corresponding to its thread height.

3. An arrangement as defined in claim 1, wherein said internal thread is rounded at said crest thereof with a radius substantially corresponding to its thread height.

4. An arrangement as defined in claim 1, wherein said internal thread is chamfered at its crest.

5. An arrangement as defined in claim 4, wherein an angle which the chamfer at said crest encloses with the latter amounts to substantially 15°.

6. An arrangement as defined in claim 1, wherein said flat flank surface portions of each of said threads enclose with one another a thread profile angle amounting to substantially 60°.

7. An arrangement as defined in claim 1, wherein said threads are double-start threads.

8. An arrangement as defined in claim 1, and further including a power tool and wherein the chuck is part of the power tool.

9. An arrangement as defined in claim 8, wherein the power tool is a hammer drill.

* * * * *